United States Patent [19]

Tress et al.

[11] 3,929,459
[45] Dec. 30, 1975

[54] CHARGING AN ELECTRIC FURNACE

[75] Inventors: Jack E. Tress; Willard L. Hunter, both of Albany, Oreg.

[73] Assignee: The United States of America as represented by the Secretary of the Interior, Washington, D.C.

[22] Filed: Mar. 13, 1974

[21] Appl. No.: 450,636

[52] U.S. Cl. .................................. 75/12; 75/11
[51] Int. Cl.² .......................................... C21C 5/52
[58] Field of Search ............................ 75/10–12

[56] References Cited
UNITED STATES PATENTS

| | | | |
|---|---|---|---|
| 2,805,929 | 9/1957 | Collin | 75/11 |
| 2,894,831 | 7/1959 | Old | 75/10 |
| 3,224,871 | 12/1965 | Collin | 75/11 |

Primary Examiner—Peter D. Rosenberg
Attorney, Agent, or Firm—Roland H. Shubert; Donald R. Fraser

[57] ABSTRACT

A metallic charge is introduced into an electric furnace in a continuous fashion using as a feeding device an unobstructed tubular container of undulant or zigzag shape. The feeding device is oriented horizontally and is rotated about its longitudinal axis causing the charge to advance through the container and discharge into the furnace through a roof port.

The feeding device can handle a variety of material sizes and shapes, ranging from powder to shredded scrap, singly or in admixture, without modification. Hot furnace gases are vented through the feeding device thus cooling the gases and preheating the furnace charge.

8 Claims, 2 Drawing Figures

CHARGING AN ELECTRIC FURNACE

BACKGROUND OF THE INVENTION

This invention relates broadly to the processing of metals in an electric furnace. A specific embodiment of this invention relates to the continuous charging of ferrous metal materials of differing sizes and shapes into an electric furnace in a continuous fashion for the purpose of melting or refining. The ferrous materials may be in the form of iron powder, sponge iron briquettes, pre-reduced iron ore pellets or shredded scrap metal such as that obtained by the Proler method. These ferrous materials may be continuously fed either singly or in admixture into an electric furnace in counterflow relationship to hot furnace gases to thereby cool the gases and preheat the furnace charge.

With the advent of the basic oxygen furnace and the development of pre-reduced iron ore pellets, the use of the electric furnace in steel making has obtained greater importance. The proportion of scrap iron in the charge to a basic oxygen furnace is severely limited while an electric furnace can operate on charges of essentially 100% scrap. Highly metallized pre-reduced iron ore pellets constitute a desirable feed for an electric furnace because of the ease of which the pellets can be transported, stored and charged into the furnace and because of their uniformity in composition.

The majority of electric furnaces today are top charged. That means that the charge is dumped into the furnace after the roof has been removed or swung away. The furnace charge is placed in a drop-bottom bucket and released into the furnace. This method of charging results in a very quick loading of the furnace but, because of the bulk of scrap metal, it is usually necessary to charge the furnace two or more times for a single heat. Removal of the roof from a furnace containing molten metal results in rapid cooling of the furnace and roof linings and considerable heat loss by radiation. Such rapid temperature changes may lead to spalling and other damage to the refractory linings but this damage is minimized by holding the charging time to a short a period as possible. In addition to heat loss this method of furnace charging tends to decrease production because of the furnace dead time during the charging procedure.

Gases and fumes produced in the furnace are usually vented through a port in the roof and treated to remove particulate matter. Gases vented from the furnace represent a loss in sensible heat as their exit temperature is usually in the range of about 1000° to 1200°C with a ferrous metal furnace charge. Additionally, these exhaust gases represent a loss of chemical energy proportionate to the amount of carbon monoxide and other combustible gases they contain. The gases must be cooled prior to the removal of particulates by such means as electrostatic precipitators or baghouses and this heat energy carried by the gases is seldom recovered.

There have been attempts to develop techniques for the continuous feeding of ferrous materials into electric furnaces. Techniques and devices now available operate well on a homogenous charge material. Pre-reduced iron ore pellets in particular are amenable to continuous charging because of their flow characteristics and their uniformity in size and shape. However, up to this time techniques and devices for the continuous charging of materials into an electric furnace lack versatility; they are tailored for a specific type and size of charge material.

SUMMARY OF THE INVENTION

Metallic materials ranging in size and shape from powders to shredded scrap, either singly or admixture, may be continuously charged into an electric furnace using a tubular container of undulant shape rotating about its longitudinal axis as a feeding device. The feeding device preferably discharges into a conduit communicating with the interior of the furnace through the furnace roof. Furnace gases are vented through that same conduit and pass in counterflow fashion through the feeding device. The tumbling action imparted to the charge by the feeding device insures excellent contact between the entering charge and the exiting gases thus preheating the charge and cooling the gases. In a preferred embodiment, air in sufficient quantity to burn up all carbon monoxide contained in the exiting furnace gases is allowed to enter the system at the juncture between the rotating feeder and the stationary roof conduit. This simplifies the system in that problems of providing a seal exposed to high temperature gases are alleviated. It also substantially reduces the carbon monoxide content of the furnace gases while recovering much of the heat energy released by the combustion of carbon monoxide. Gas flow through the feeding device is controlled by means of an induced draft fan located downstream to the gas flow from the feeding device.

Hence, it is object of our invention to provide a method and means for continuously feeding a variety of particulate metallic materials into an electric furnace.

It is another object of our invention to recover the heat energy from vented furnace gases to preheat the furnace charge while cooling the gases so that they be further cleaned before venting to the atmosphere.

DETAILED DESCRIPTION OF THE INVENTION

The invention will be more particularly described with reference to the illustrated embodiments thereof shown in the accompanying drawings wherein.

Use of our invention provides the following advantages and benefits as compared to the conventional practices now employed:

1. A variety of metallic feed materials can be charged to an electric furnace in a continuous fashion without modifying, adjusting or changing the feeding apparatus.

2. Furnace dead time is reduced because operation of the furnace need not be halted for charging.

3. Savings in heat and energy are realized because the furnace roof is not removed for charging and heat content of the furnace gases is utilized to preheat the charge.

4. Thermal stresses on the refractory lining of the furnace side walls and roof are substantially reduced because the furnace need not be opened up for charging.

Figure 1:
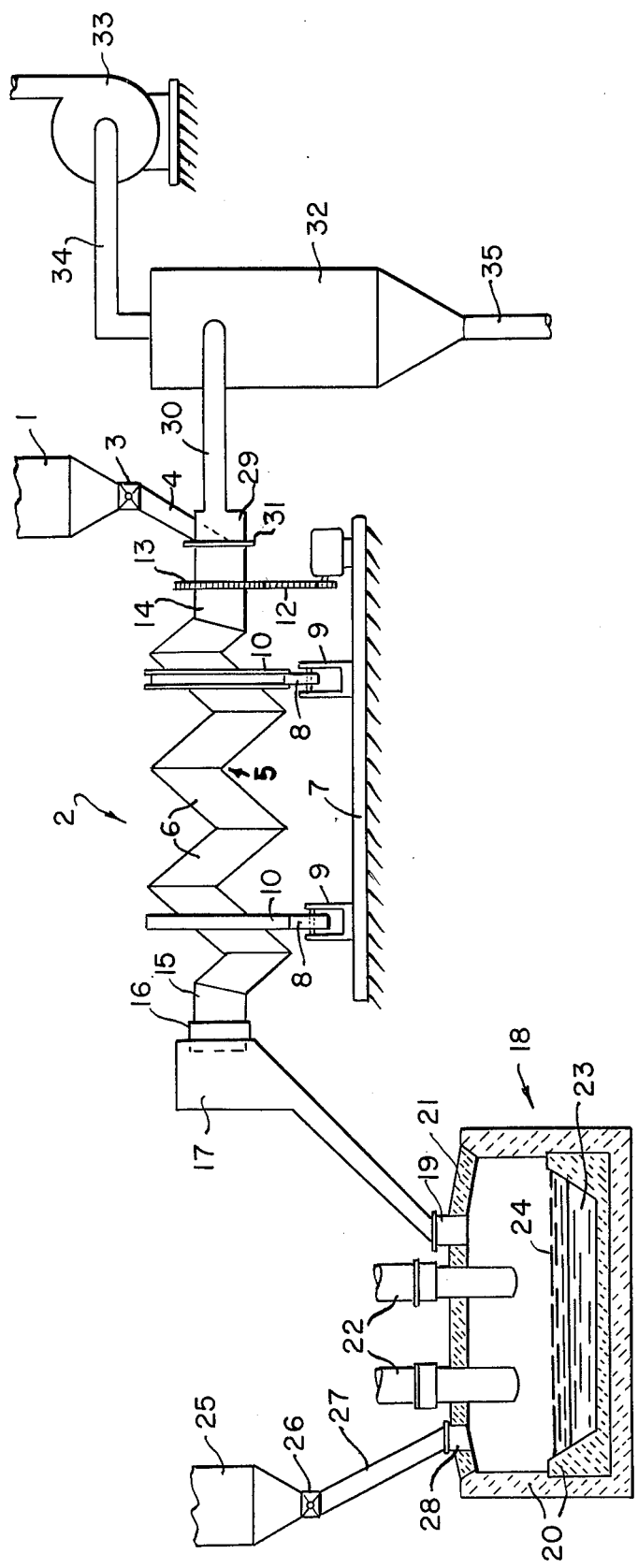
FIG. 1 is a schematic partial sectional view of a plant utilizing one preferred form of apparatus for carrying out the process of this invention.

Referring now to FIG. 1, the particulate metallic material to be charged into the electric furnace is contained in hopper or bin 1 and is introduced into rotating feeder 2 by means of control apparatus 3 and chute 4. Feeder 2 comprises a container 5 fabricated of metal capable of withstanding the hot gases emanating from an electric furnace. Container 5 is formed of a series of intercommunicating truncated tubular sections 6 which form a series of V-shaped members disposed in a zig-zag relation in one place. Container 5 is oriented with its longitudinal axis in a substantially horizontal attitude and is mounted upon base number 7 for rotation about its longitudinal axis. Trunnion wheels 8 carried by brackets 9, which are mounted upon base 7, engage corresponding trunnion rims 10 to support the container for rotation. Container 5 terminates in cylindrical end members 14 and 15. A rotational force is applied to container 5 in any suitable fashion such as by means of motor 11 driving container 5 through a chain or belt 12 and a sprocket or pulley means 13 mounted on end member 14. End member 15 is rotatably disposed within hub 16 which is mounted on stationary conduit means 17. Conduit means 17 in turn communicates with the interior of electric furnace 18 by way of roof port 19.

Electric furnace 18 is of conventional construction being provided with a refractory lining 20 and a removable roof 21. Heat is supplied to the charge within the furnace by means of current carrying electrodes 22 which pass through the furnace roof. Liquid metal 23 and slag 24 collect in the bottom of the furnace and may be periodically withdrawn through tap holes (not shown) in the side of the furnace as is known in the art. Alternatively, the furnace may be tapped by tipping the contents of the furnace into a ladle as is also conventional. Carbonaceous reducing agents such as coke or slagging agents such as limestone of silica may be supplied to the furnace from hopper 25 through control device 26 and conduit 27 which communicates with the interior of the electric furnace by way of roof port 28. Alternatively, slagging agents may be introduced into the furnace by way of the feeder-preheater in association with the furnace charge.

Particulate metallic materials to be melted or refined are passed from bin 1 into cylindrical end section 14 of container 5. Rotation of the container causes the material to advance through the feeder and be discharged into chute 17 and thence into the furnace. Gases produced by operation of the furnace are vented through roof port 19 and pass in counterflow fashion to the incoming charge material through chute 17 and container 5. The tumbling action imparted to the charge by rotation of container 5 insures excellent contact between the exiting furnace gases and the charge material. Cooled gases are drawn from container 5 by way of hub 29 and conduit 30. Seal means 31 provides a juncture between rotating end member 14 of container 5 and stationary hub 29. Furnace gases, cooled by passage through container 5, are subjected to a preliminary cleaning step in cyclone 32 by action of induced draft fan 33 which communicates with the cyclone discharge by way of conduit 34. Cleaned gases may be discharged from fan 33 directly to the atmosphere or, in appropriate cases, the gases may be subjected to further cleaning as in a baghouse or electrostatic precipitator. Particulate materials separated from the gases may be removed from the cyclone by way of conduit 35. Induced draft fan 33 may be located ahead of cyclone 32 with equivalent result.

In steel making operations, the gases vented from an electric furnace are at a temperature within the range of 1000° to 1200°C and often contain significant quantities of carbon monoxide. It is preferred, but not required, that hub 16, which connects cylindrical end portion 15 and stationary chute 17, be constructed so as to allow air leakage into the system at this point. Such deliberate air leakage alleviates many problems with rotating seals operating at these temperatures and provides a source of oxygen to burn up carbon monoxide and any other combustible materials which are contained in the furnace vent gases. Much of the heat released by the combustion reaction is utilized in preheating the furnace charge. In the case where iron powder comprises the charge material, care must be taken to limit gas flow through the feeding device to a rate such that iron particles are not entrained by the gas stream.

Figure 2:
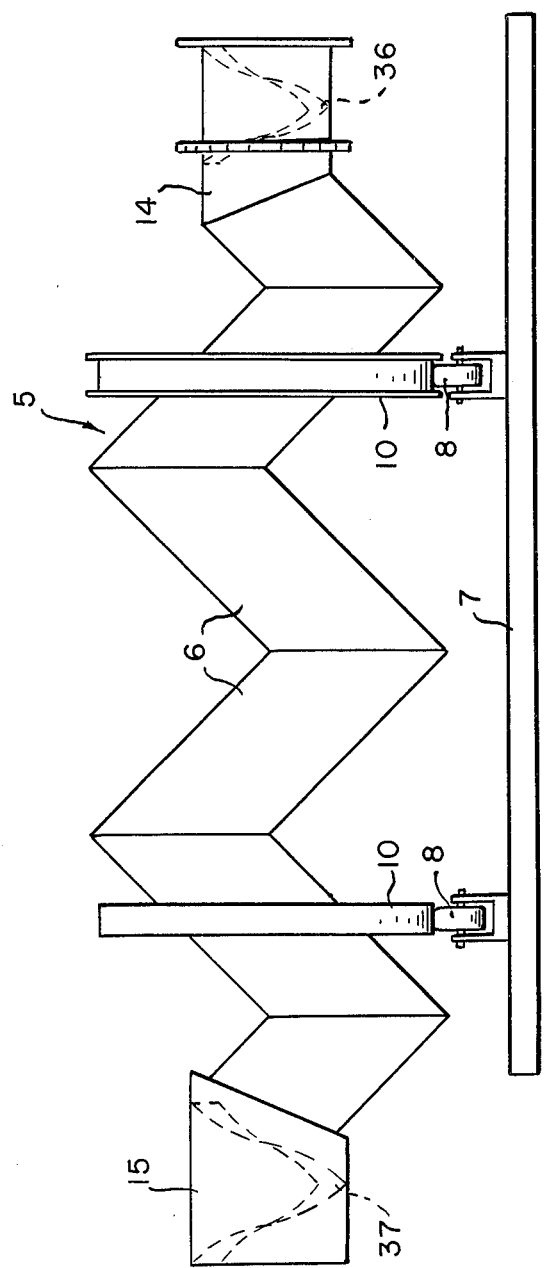
FIG. 2 illustrates details of the feeding device used in the apparatus of FIG. 1.

Referring now to FIG. 2, feeder 5 is shown in greater detail. Truncated tubular sections 6 are preferably joined at an angle of 75° to 135° to each other to form a series of interconnected V-shaped chamgers. It is preferred that each tubular section be set at an angle of 45° to the longitudinal axis, or axis of rotation, of the device. The number of tubular sections making up the feeder may vary but it is preferred that there be provided of minimum of 6 such sections. The number of angled tubular sections and the speed of rotation determine the residence time of the charge material. The following equation approximates the residence time:

$$\text{Minimum residence time (min.)} = \frac{\frac{(\text{Number of angled sections})}{(2)} + 2}{\text{rpm}}$$

A residence time of about one half minute usually is sufficient to insure adequate cooling of the furnace gases and heating of the charge stock. Appropriate rotational speeds will generally be in the range of about 5 to 20 rpm.

As has been discussed previously, the feeder rotates about its longitudinal axis supported by trunnion wheels 8 engaging corresponding trunnion rims 10. One or both of the trunnion rims may be grooved so as to provide longitudinal stability for the device. Disposed circumferentially within end member 14 is material guide means 36 which may be a ribbon-like member in the form of a single or multiple helix. Upon rotation of the feeder, member 36 causes the feed material to advance into the zig zag portion of the device.

A similar helical member 37 is disposed circumferentially within cylindrical end section 15 at the discharge end of the feeder. With the exception of helical members 36 and 37 the interior of the feeder device is entirely unobstructed. It is preferred that the exterior of the feeding device be well insulated so as to conserve heat energy and to provide for safer operation.

In a preferred embodiment the furnace is operated in a semicontinuous fashion without removing the roof between heats. This can be accomplished by providing two tap holes (not shown in the drawings) in the furnace wall to periodically tap slag and molten metal. At the completion of a heat, the slag may be tapped from the furnace through an upper tap hole after which molten metal may be tapped through a lower tap hole. The lower tap hole is preferably located slightly above the level of the furnace floor so that a residue of molten metal remains in the furnace after tapping. Leaving a residue of molten metal within the furnace allows an immediate resumption of furnace operation without arc damage to the floor of the furnace. Alternatively, both slag and metal can be tapped from a single top hole located slightly above the level of the furnace floor. When a tilting electric furnace is used, slag and metal can be separately tapped through a single tap hole located above the slag line as is also well known.

Most electric furnaces utilize three electrodes arranged in delta configuration near the center of the furnace. When such an electrode configuration is used, it is preferred that the charge material be fed into the middle of the delta. It is also preferred to operate the furnace during the melt down phase of a heat with a surplus of unmelted charge stock present in the furnace. A surplus of unmelted charge stock in close proximity to the electrodes increases efficiency of the process and tends to provide some shielding of the refractory from the arc.

In some instances it is desirable to provide a further refining step for the molten metal. In such cases, slag may be tapped from an upper tap hole at the completion of the melting phase of a heat, and additional refining agents or fluxes may be added. Slag formed during the refining step may then be tapped after which the molten metal may be withdrawn as was described before.

Energy savings realized by use of the process and apparatus of this invention were determined experimentally to be on the order of 10% when charging ferrous materials such as pre-reduced iron ore pellets and shredded scrap. This comparison was made using the same electric furnace charged from the top after removing the roof as opposed to a continuous introduction of charge materials. Furnace gases entering the discharge end of the feeder were at a temperature in excess of 1000°C and were cooled to a temperature less than 300°C after passage through the feeder. Retention time of the charge material within the feeder was slightly in excess of one half minute. A controlled leakage of air was allowed at the juncture between the rotating feeder and the stationary chute leading to the electric furnace. The carbon monoxide content of the furnace gases after passing through the feeder was essentially zero.

We claim:

1. A process for charging solid objects comprising metals of varying size and shape into an electric furnace which comprises:
   introducing said metallic objects into one end of an unobstructed tubular container of undulant shape, said container being disposed with its longitudinal axis in a substantially horizontal attitude and being adapted to rotate about its longitudinal axis;
   rotating said container to cause said objects to be advanced through the container to the opposite end thereof and to cause a tumbling and mixing action in which said objects are repeatedly passed through a hot counter-flowing gas stream while advancing through said container to rapidly transfer the heat content of said gas stream to said objects, and
   discharging said objects from the container into conduit means communicating with the interior of an electric furnace in counterflow relationship to hot gases emanating from said furnace and passing through said conduit means and through said container thereby cooling said hot furnace gases and heating said objects.

2. The process of claim 1 wherein said solid objects are ferrous and wherein said objects are selected from the group consisting of iron powder, sponge iron briquettes, pre-reduced iron ore pellets and shredded scrap metal.

3. A process for producing steel in an electric furnace which comprises:
   a. introducing particulate ferrous material selected from the group consisting of iron powder, sponge iron briquettes, pre-reduced iron ore pellets and shredded scrap metal into one end of an unobstructed tubular container of undulant shape, said container being disposed with its longitudinal axis in a substantially horizontal attitude and being adapted to rotate about its longitudinal axis;
   b. rotating said container to cause said ferrous material to be advanced through the container to the opposite end thereof and to cause a tumbling and mixing action in which said ferrous material is repeatedly passed through a hot counter-flowing gas stream while advancing through said container to rapidly transfer the heat content of said gas stream to said ferrous material;
   c. discharging said ferrous material from the container into the electric furnace through conduit means communicating between the interior of said furnace and the discharge end of said container;
   d. withdrawing gases produced within the furnace through said conduit means and through said container in counterflow relationship to the advancing ferrous material to cool said gases and heat said ferrous material;
   e. periodically interrupting the operation of said furnace and tapping molten steel from the furnace but leaving a minor portion of said molten steel within the furnace, and
   f. thereafter repeating steps (a) through (e).

4. The process of claim 3 wherein a carbonaceous reducing agent and a slagging agent are introduced into said furance in association with said ferrous material.

5. The process of claim 4 wherein the residence time of said ferrous material in said container is greater than one-half minute.

6. The process of claim 5 wherein air is introduced into said container at the discharge end thereof in sufficient amount to oxidize combustible components in said furnace gases.

7. The process of claim 4 wherein said ferrous material is discharged into said electric furnace at a central portion thereof in close proximity to the electrodes of said furnace.

8. The process of claim 7 wherein said ferrous material is discharged into said furnace at a rate whereat a surplus of unmelted ferrous material is present in the furnace and wherein discharge of ferrous material into said furnace is halted and surplus ferrous material is melted prior to tapping.

* * * * *